(12) United States Patent
Gollier

(10) Patent No.: US 7,944,598 B2
(45) Date of Patent: May 17, 2011

(54) SPECKLE MITIGATION IN LASER SCANNER PROJECTOR SYSTEMS

(75) Inventor: Jacques Gollier, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 3 days.

(21) Appl. No.: 12/266,139

(22) Filed: Nov. 6, 2008

(65) Prior Publication Data

US 2010/0110524 A1   May 6, 2010

(51) Int. Cl.
 *G02F 1/01* (2006.01)
(52) U.S. Cl. ...................................................... 359/279
(58) Field of Classification Search .................. 359/279, 359/280, 281, 220, 223, 224, 237, 290, 291, 359/292
See application file for complete search history.

(56) References Cited

U.S. PATENT DOCUMENTS

| | | | |
|---|---|---|---|
| 5,313,479 A | 5/1994 | Florence | |
| 6,081,381 A | 6/2000 | Shalapenok et al. | |
| 6,154,259 A | 11/2000 | Hargis et al. | |
| 6,323,984 B1 | 11/2001 | Trisnadi | |
| 6,367,935 B1 | 4/2002 | Wang et al. | |
| 6,577,429 B1 | 6/2003 | Kurtz et al. | |
| 6,594,090 B2 | 7/2003 | Kruschwitz et al. | |
| 6,738,105 B1 | 5/2004 | Hannah et al. | |
| 6,747,781 B2 | 6/2004 | Trisnadi | |
| 6,863,216 B2 | 3/2005 | Tsikos et al. | |
| 6,870,650 B2 | 3/2005 | Kappel et al. | |
| 6,874,893 B2 | 4/2005 | Park | |
| 6,952,435 B2 | 10/2005 | Lai et al. | |
| 7,133,119 B1 | 11/2006 | Pettibone et al. | 355/71 |
| 7,399,084 B2 | 7/2008 | Morikawa et al. | |
| 2006/0001780 A1 | 1/2006 | Ahn et al. | |
| 2006/0109553 A1 | 5/2006 | Serafimovich et al. | |
| 2006/0238743 A1 | 10/2006 | Lizotte et al. | |
| 2006/0250532 A1 | 11/2006 | Shin | |
| 2007/0153235 A1 | 7/2007 | Morikawa et al. | |
| 2007/0252560 A1 | 11/2007 | Laufenberg et al. | |

FOREIGN PATENT DOCUMENTS

| | | |
|---|---|---|
| WO | 2005/041423 A2 | 5/2005 |
| WO | 2005/062114 A1 | 7/2005 |
| WO | 2005/098532 A1 | 10/2005 |
| WO | 2006/137326 A1 | 12/2006 |

OTHER PUBLICATIONS

Kasazumi et al., "A practical laser projector with new illumination optics for reduction of speckle noise", Japanese Journal of Applied Physics, Part 1 (Regular Papers, Short Notes & Review Papers), v 43, n 8B, Aug. 2004, p. 5904-6.

Trisnadi, "Hadamard speckle contrast reduction", Optics letters, v 29, n 1, Jan. 1, 2004, p. 11-13.

Trisnadi, "Speckle contrast reduction in laser projection displays", Proceedings of the SPIE, v 4657, 2002, p. 131-7.

Shin et al., "Removal of speckle using a computer generated random phase hologram plate in green wavelength (532 nm)", Proceedings of SPIE, v 6288, 2006, p. 62880.

*Primary Examiner* — Timothy J Thompson
*Assistant Examiner* — Tuyen Q Tra
(74) *Attorney, Agent, or Firm* — Michael W. Russell

(57) ABSTRACT

Laser scanner projection systems that reduce the appearance of speckle in a scanned laser image are provided. The laser projection system includes a visible light source having at least one laser, a scanning element and a system controller. The system controller is programmed to generate a scanned laser image. The system further includes a first lens that focuses a scanned output beam onto an intermediate image and a second lens that projects the intermediate image onto a projection surface. A periodic phase mask having a period that is approximately equal to or greater than the beam waist diameter of the scanned output beam is positioned at the intermediate laser image. The period of the periodic phase mask is such that the projection of the scanned output beam jumps progressively from pixel to pixel, thereby reducing speckle contrast in the scanned laser image.

22 Claims, 3 Drawing Sheets

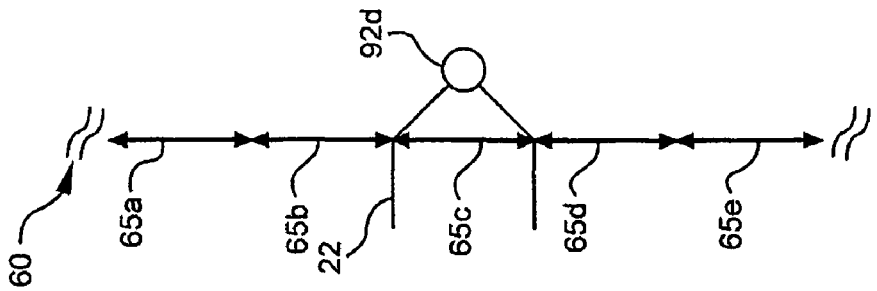
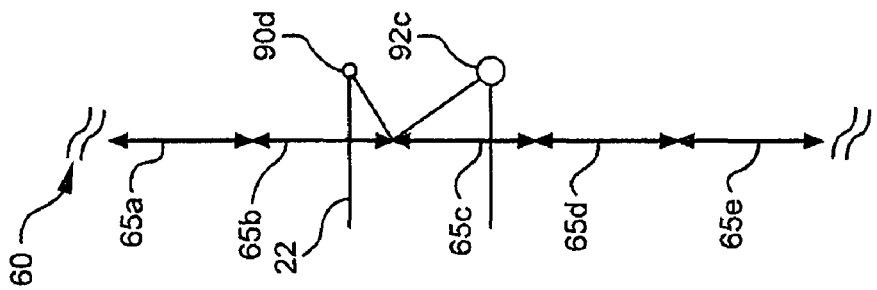
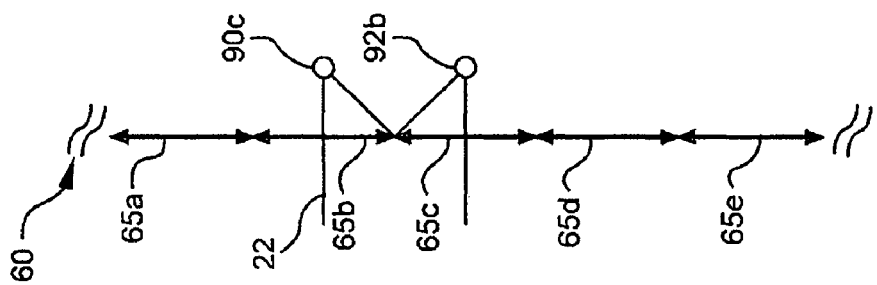
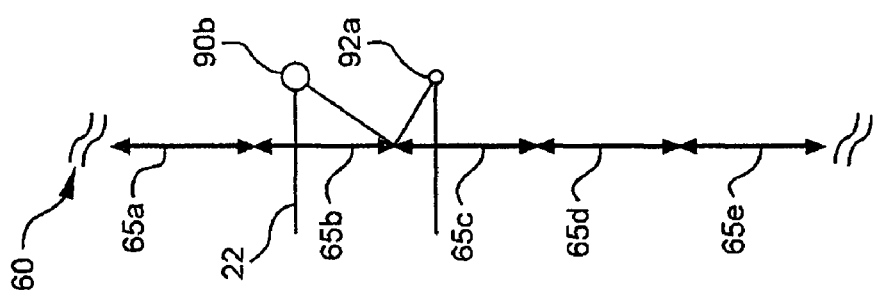
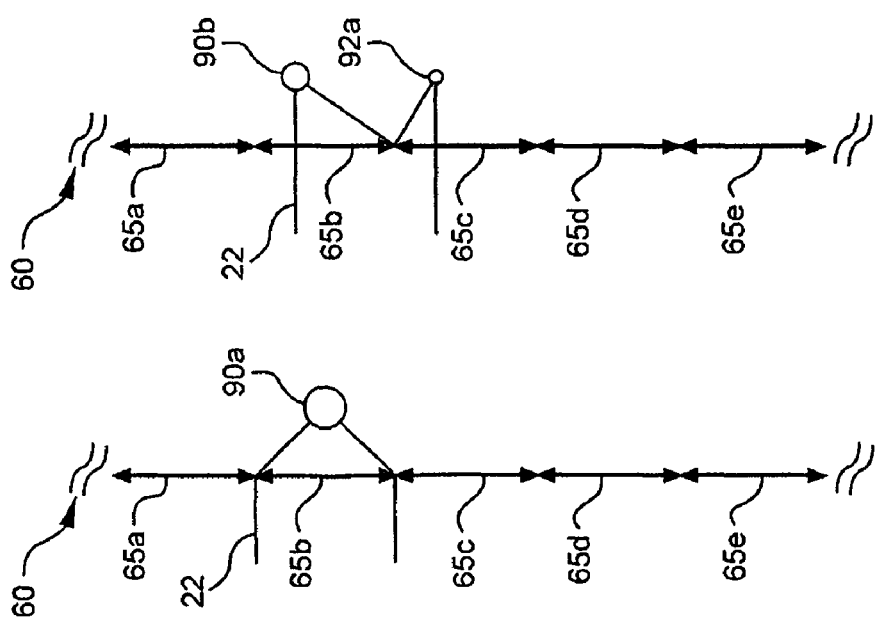

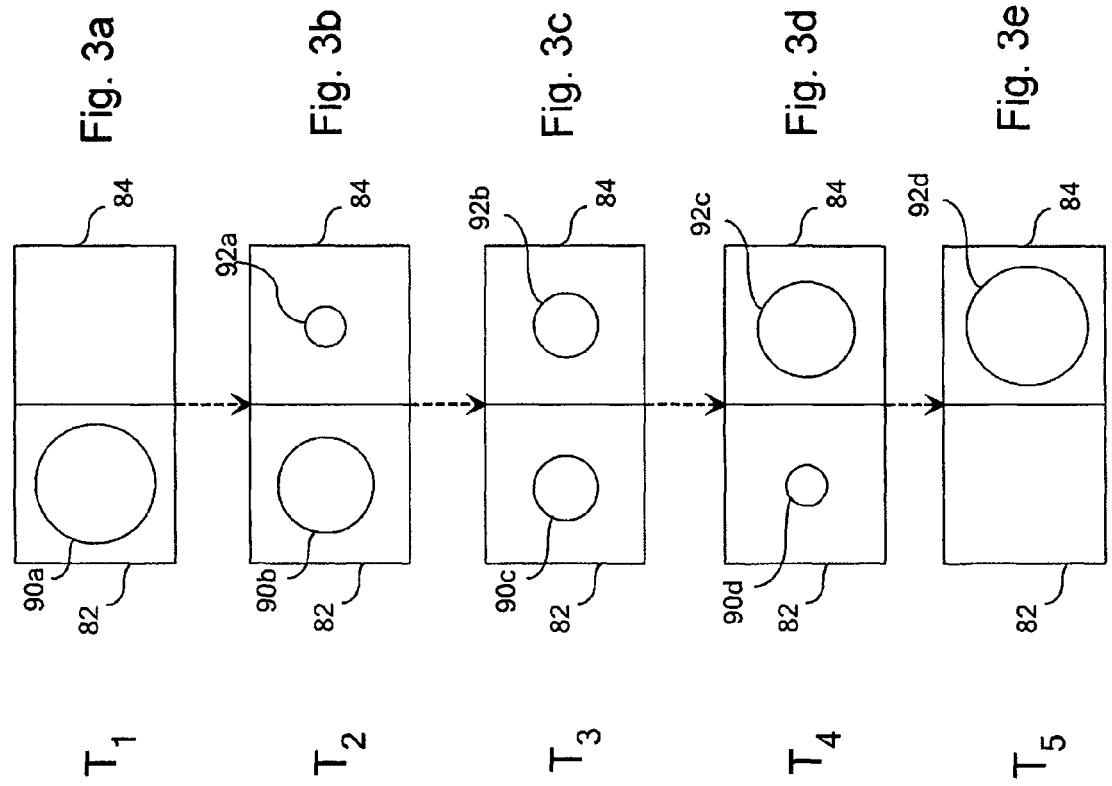

SPECKLE MITIGATION IN LASER SCANNER PROJECTOR SYSTEMS

BACKGROUND

1. Field of the Invention

Embodiments of the present invention relate to laser scanner projection systems. More specifically, embodiments of the present invention relate to laser projection systems and related methods that reduce the appearance of speckle that may be visible in a laser projection image by the use of a periodic phase mask.

2. Technical Background

Speckle may result whenever a coherent light source is used to illuminate a rough surface, for example, a screen, or any other object that produces a diffused reflection or transmission. Particularly, a multitude of small areas of a screen or other reflecting object scatter light into a multitude of reflected beams with different points of origination and different propagation directions. Speckle causes high spatial frequency noise in the projected image. At an observation point such as an observer's eye or a camera's sensor, these beams can interfere constructively to form a bright spot, or destructively to form a dark spot, producing a random granular intensity pattern known as speckle.

Speckle may be characterized by its grain size and contrast, where contrast is usually defined as a ratio of standard deviation to mean light intensity in the observation plane. For a large enough illuminated area and a small enough individual scattering point size, speckle will be "fully developed," with a brightness standard deviation of 100%. If an image is formed on a screen using laser beams, such granular structure will represent noise or a severe degradation of the image quality. Although this noise may not be a significant problem when a projector is used to display images, it can be a serious issue when the projector is used to display high spatial frequency content, such as text.

The general concept of using diffusers to minimize speckle consists of projecting an intermediate laser image over a small sized diffusing surface, and using projection optics to re-image that intermediate laser image on the final screen. By rapidly moving the diffuser, the phase of the electric field is scrambled over time, which changes the perceived speckle pattern. If the diffuser is moving or vibrating fast enough, the perceived speckle pattern will also change at high frequencies and such pattern changes will be time averaged by the eye. To work efficiently, multiple speckle frames need to be created over the integration time of the eye, which is typically in the order of 50 Hz.

Although rapidly moving the diffuser may provide speckle reduction, it requires an expensive and complicated mechanism to move the phase mask laterally at a relatively high speed.

SUMMARY

It is against this background that systems and methods of speckle reduction that do not require movement of a diffuser are desired. According to one embodiment of the present invention, a laser projection system is provided. The laser projection system includes a visible light source further including at least one laser, a scanning element and a system controller. The system controller is programmed to generate a scanned laser image by operating the laser for optical emission of encoded image data and controlling the scanning element to scan an output beam of the visible light source across a plurality of image pixels.

The system further includes a first lens that focuses the scanned output beam to form an intermediate laser image. A second lens projects and re-images the intermediate image onto a projection surface. A periodic phase mask is positioned at the intermediate laser image. The periodic phase mask has a period that is approximately equal to or greater than the beam waist diameter of the scanned output beam at the intermediate laser image. The period of the periodic phase mask is such that the projection of the scanned output beam jumps progressively from pixel to pixel, thereby creating different speckle patterns that are averaged by the eye or sensor. In other words, as the output beam scans over the periodic phase mask, the shape of the beam at the screen changes rapidly because of the rapid intensity modulation created by the phase mask. The laser projection system may also include a pupil phase mask that is configured to introduce a phase variation close to the pupil of the second lens.

According to another embodiment, a laser projection system is provided. The system includes a visible light source, a scanning element, a system controller and a periodic phase mask. The system controller is programmed to generate an intermediate laser image by operating the laser for optical emission of encoded image data, and control a scanning element to scan an output beam of the visible light source across a plurality of image pixels. The periodic phase mask has a period that is approximately equal to or greater than the beam waist diameter of the scanned output beam at the intermediate laser image.

A method for reducing speckle in the projected image of a laser projection system comprises passing a scanning laser beam comprising encoded image data through a first lens that focuses the laser beam to form an intermediate laser image, passing the scanning laser beam comprising the intermediate laser image through a periodic phase mask having a period that is equal to or greater than a beam waist diameter of the scanning laser beam at the intermediate laser image, generating a plurality of orders of diffraction of the scanning laser beam, projecting the intermediate laser image through a second lens and then through a pupil phase mask to form a projected image on a surface, wherein the projected intermediate laser image comprises a projected scanned output beam that jumps progressively from pixel to pixel to reduce speckle contrast in a the projected image.

BRIEF DESCRIPTION OF THE DRAWINGS

The following detailed description of specific embodiments of the present invention can be best understood when read in conjunction with the following drawings, where like structure is indicated with like reference numerals and in which:

FIGS. 2a-e are schematic illustrations of an exemplary output beam focused upon a periodic phase mask according to one or more embodiments; and FIGS. 3a-e are schematic illustrations of an exemplary beam spot as the output beam of the visible light source is scanned across a projection surface according to one or more embodiments.

DETAILED DESCRIPTION

Figure 1:
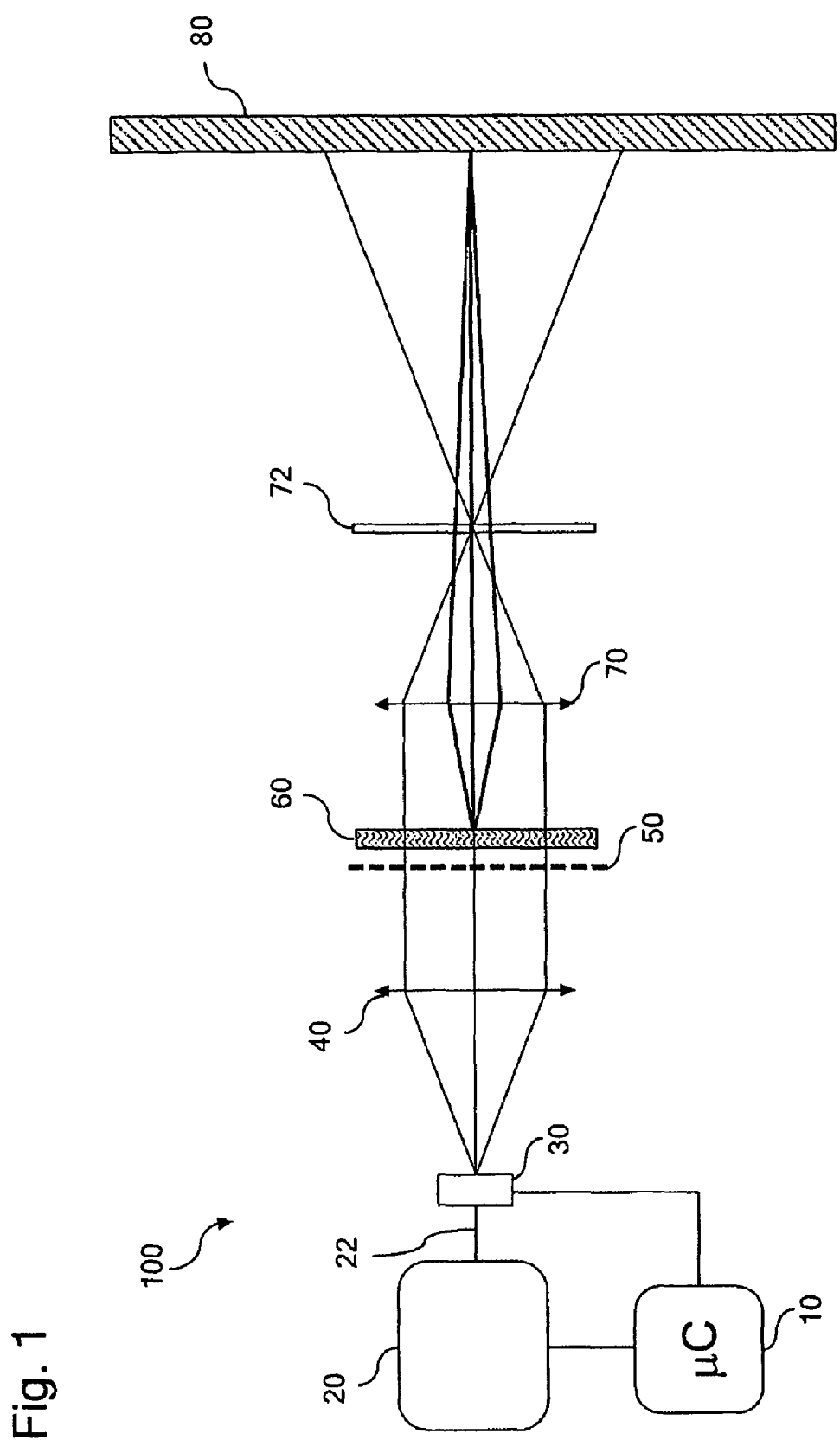
FIG. 1 is a schematic illustration of an exemplary laser projection system according to one or more embodiments.

Particular embodiments may be described in the context of a laser projection system that is configured to scan an output signal or beam across a projection surface to generate a two-dimensional image (e.g., a raster scan). The appearance of speckle in the scanned laser image may be reduced by rapidly creating many different speckle patterns on the projection surface. A human eye or sensor integrates and averages the different speckle patterns and the appearance of speckle is therefore reduced.

According to some embodiments, a periodic phase mask is positioned proximate an intermediate laser image formed by projection optics and is configured to reduce the appearance of speckle in a screen or surface by rapidly altering the shape and size of the beam before it is projected onto the screen or surface. The period of the phase mask is approximately equal to or greater than the beam waist diameter of the laser beam used to form the intermediate image at the intermediate image plane. As the beam is scanned across the periodic phase mask, the selected periodicity alters the output beam as it passes through the mask. Specifically, when the beam is focused on a center portion of a particular period within the phase mask, a single sub-beam is created, and when the output beam is focused between particular periods, two or more sub-beams are created. After passing through the periodic phase mask, the beam is projected to the final screen via a lens such that the phase modulation of the phase mask is transformed into high spatial frequency intensity modulation at the location of the screen.

The changing sub-beams thus illuminate different areas on the projection surface. A single beam spot that is projected onto the projection surface is therefore gradually morphed into two or more beam spots, and then back into another single beam spot, as the beam is scanned. As described in detail herein, the rapidly altering beam spots and phase modification result in the generation of multiple speckle patterns that are averaged by the eye or sensor, thus mitigating the appearance of speckle in the image.

Referring to FIG. 1, an exemplary laser scanner projection system 100 comprises a visible light source 20, a scanning element 30, such as a scanning mirror capable of scanning in at least one horizontal and vertical direction, and a system controller 10. Particularly, the visible light source 20 may comprise one or more lasers, such as semiconductor lasers, optically-pumped solid state lasers, fiber lasers, or any similar laser, and is configured to generate one or more output beams 22 (e.g., lasers configured to emit red, blue or green output beams). The system controller 10 may be configured control the laser or lasers 20 and the scanning element 30.

The system controller 10, which may be implemented as a microcontroller or other similar device, can control the laser or lasers 20 to emit optical emission of encoded image data that can be used to form the projected image. Further, the system controller 10 controls the scanning element 30 such that the output beam can be scanned (e.g., rastered) across a plurality of pixels on a projection surface 80, such as a projector screen. Therefore, the system controller 10, laser 20 and scanning element 30 cooperate to generate a two-dimensional scanned laser image on a projection surface 80.

According to the embodiment illustrated in FIG. 1, the laser scanner projection system 100 comprises first and second lenses 40 and 70, a periodic phase mask 60 and a pupil phase mask 72. The first lens 40 focuses the scanned output beam 22 and creates an intermediate laser image 50 at an intermediate plane that is located approximately on the periodic phase mask 60. The period of the periodic phase mask 60 is approximately equal to or greater than the beam waist diameter of the output beam 22 at the intermediate laser image 50 (i.e., the period is such that the beam is altered as it is scanned). The output beam 22 generates a beam spot that is scanned across the periodic phase mask 60. The second lens 70 then re-images the intermediate laser image 50 that is superimposed to the phase mask onto the projection surface 80. Exemplary periodic phase masks 60 may comprise lens arrays, holographic beam splitters, sinusoidal gratings and the like. Additionally, as described herein below, a phase variation can be introduced after the projection lens by a second phase mask 72, or by a defocus or aberration element incorporated into the second lens 70. The second phase mask 72 may be a pupil phase mask.

The periodic phase mask 60 of the embodiment illustrated in FIG. 1 is configured together with the other system elements to illuminate beam spots on the projection surface 80 that jump progressively from pixel to pixel as the output beam 22 is scanned across the mask 60. The periodic phase mask 60 generates a plurality of orders of diffraction as the output beam 22 passes through the mask 60. Although it is desirable to implement a static periodic phase mask 60, some embodiments may also implement a periodic phase mask 60 that is moved or vibrated laterally. The periodic phase mask 60 may be any type of mask having a period that is similar to the size of the beam spot that is focused on the mask.

FIGS. 2a-e illustrate an embodiment in which the periodic phase mask 60 is configured as a two-dimensional lens array. The particular figures depict an output beam 22 that is focused on different positions of the lens array 60. The first lens 40 (illustrated in FIG. 1) and the lens array 60 are designed such that the diameter of the lenses in the array 60 is similar to or larger than the waist diameter at the level of the array 60 (e.g., at the intermediate laser image 50).

In FIG. 2a, the output beam 22 is centered on lens 65b, a particular lens within the array 60. As may be seen in the figure, after being re-imaged by the second lens 70 (illustrated in FIG. 1), all of the light is focused onto a single spot 90a on the projection surface. At this position, the average illumination angle is the normal angle of incidence.

Referring now to FIG. 2b, as the output beam 22 is scanned down the periodic phase mask 60 (i.e., the lens array 60 of the illustrated embodiment) the output beam 22 moves to a position that is between lenses 65b and 65c. Because the output beam 22 is focused between two lenses, the output beam 22 is split into two sub-beams that are focused onto the projection surface 80, and which form two smaller spots 90b and 92a that are illuminated at a certain incidence angle. Spot 90a in FIG. 2a is now the smaller illuminated spot 90b in FIG. 2b because a portion of the output beam 22 jumps into spot 92a as the beam is scanned. In other words, when the output beam 22 is between two lenses, two smaller spots are illuminated.

As the output beam 22 continues the scan, spot 90b becomes smaller and spot 92a becomes larger until, as shown in FIG. 2c, the output beam 22 is equally split between lenses 65b and 65c producing two equally-sized spots 90c and 92b. As the output beam 22 is further scanned down the periodic phase mask 60, two spots 90d and 92c are illuminated at a certain incidence angle (FIG. 2d). The spot 90d is smaller than spot 90c, while spot 92c is larger than sport 92b. Finally, FIG. 2e illustrates that as the output beam 22 is centered on lens 65c, all of the light of the output beam 22 is focused on spot 92d and spot 90 (i.e., spots 90a-d) is now eliminated.

In this manner, the period of the lens array and the objective properties of the first lens 40 are such that the projection of the scanned output beam 22 jumps progressively from pixel to pixel. The incident angle illuminating each spot on the screen is constantly changing as a function of time, thereby resulting in a significant reduction of speckle. Although FIGS. 2a-d illustrate a lens array embodiment, other periodic phase masks having the requisite periodicity produce the same or similar results.

FIG. 3 provides an illustration of the progressive effect of a periodic phase mask 60 on the illumination of two pixels at time intervals $T_1$-$T_5$ according to some embodiments. Rather than only projecting a single beam spot onto the projection surface 80 that is scanned linearly, the periodic phase mask 60 provides that the beam spots jump progressively from pixel to pixel. It is noted that FIG. 3 illustrates only 5 time periods, and that particular embodiments may have more or less time periods as the output beam 22 is scanned across the periodic phase mask 60. Pixels areas 82 and 84 are an illustrative sample of a plurality of illuminated pixel areas on a projection surface 80, which may be a screen, wall or other surface. The square pixel areas 82 and 84 are only a graphical representation, as the projection surface 80 may or may not have defined pixel areas. Further, the projection surface 80 may comprise a flat or substantially flat surface such as a display screen or a wall, or the projection surface may comprise a contoured surface. Although the beam spots are illustrated in a fixed, static position, in actual implementation, the spots of some embodiments may have some movement as the output beam 22 is scanned across the periodic phase mask 60.

At $T_1$, spot 90a illuminates the entire pixel area 82 because the output beam 22 is centered on a single period of the periodic phase mask 60, which may be a lens array, holographic beam splitter, sinusoidal grating or the like. Pixel area 84 is not illuminated by the output beam 22 at $T_1$. At $T_2$ the output beam 22 has moved such that it is partially between two periods of the periodic phase mask 60 and therefore has been split into two sub-beams. As a result, a portion of the output beam 22 has jumped to illuminate pixel area 84 as beam spot 92a, and spot 90a (now 90b at $T_2$) is slightly smaller than it was at $T_1$. The two beam spots 90b and 92a illuminate the projection surface 80 at a certain angle of incidence. According to other embodiments, the periodic phase mask 60 may also be configured to split the output beam 22 into more than two sub-beams to illuminate more than two beam spots on the projection surface 80.

At $T_3$ the output beam 22 is positioned equally between two periods of the periodic phase mask 60 and, as a result, beam spots 90c and 92b are of equal size. At $T_4$ spot 90d is smaller than spot 92c as spot 90 continues to morph into spot 92 until finally spot 92d fully illuminates pixel area 84 and beam spot 90 is eliminated at $T_5$.

Referring once again to FIG. 1, a second phase mask 72 is introduced after the projection lens 70 to further reduce the appearance of speckle according to some embodiments. This second phase mask, which comprises a plurality of pixels, may be referred to as a pupil phase mask 72 that is in opposition of the periodic phase mask 60. The pupil phase mask 72 is configured to alter the manner in which the periodic phase mask 60 is imaged on the screen 80 by introducing a phase modification. One ideal position for the pupil phase mask 72 is in the Fourier plane of the second lens where the diffraction orders of the periodic phase mask 60 are spatially separated, as schematically illustrated in FIG. 1. The pupil phase mask 72 is advantageously configured such that the phase of the diffraction orders are equal, thereby resulting in a reduction of the diameter of the spot on the screen. According to some embodiments, the pupil phase mask 72 may be either a static or a dynamic phase mask that is modulated as a function of time.

According to another embodiment, the role of the pupil phase mask may also be achieved by introducing aberrations or phase variations into the second lens 70. This may be implemented, for example, by slightly misaligning the focus of the second lens 70 (e.g., defocusing the projected image), or by introducing a controlled aberration such as defocus or spherical aberration in the lens design. According to this embodiment, a modified second lens 70 performs the functionality of the pupil phase mask 72 by altering the relative phase of the orders of diffraction generated by the periodic phase mask 60.

Embodiments are not limited to the system depicted in FIG. 1 and may include additional components, such as a wavelength conversion device that doubles the native wavelength of the output beam 22 (e.g., a second harmonic generating crystal). Additionally, to further reduce the amplitude of speckle, a phase modulator (not illustrated) having as many pixels as the amount of diffraction orders provided by the pupil phase mask 72 or second lens 70 may be used to dynamically change the relative phase of the diffraction orders. This can result in creating high spatial frequency fringes on the screen, the shape of which changes as a function of time.

The illumination of different areas, the changing of the size or shape of the beam spots, and the varying angle of incidence of the illumination on the projection surface create different speckle patterns that are averaged by the eye or sensor. For effective speckle reduction results, the periodic phase mask 60 should provide angle of incidence variations that are larger than the eye angular extent (i.e., the eye pupil diameter over an observation distance). Further, if the periodic phase mask 60 is configured as a lens array, the pitch of the lens array multiplied by the magnification of the second lens 70 should be smaller than the resolution of the human eye (i.e., a human eye resolution element) such that observers cannot detect the individual pixels when viewing the scanned laser image.

Some embodiments of the laser scanning projector may include a fast scanning direction across the projection surface to create the lines of the image (e.g., a horizontal direction) and a slower scanning direction to create multiple lines (e.g., a vertical direction). As an example, once the laser completes a scan across the fast scanning direction, the laser may be turned off to allow the position of the scanning mirror 30 to reset. Usually, the position of the output beam 22 in the slow axis direction is maintained constant on a frame per frame basis in order to maintain the desired image resolution. The consequence is that the output beam 22 intersects the periodic phase mask 60 at the same location in the slow axis frame per frame. The angle of the scanning mirror 30 may be slightly misaligned in the slow axis direction on a frame-per-frame basis to change the position of the lines with respect to the periodic phase mask 60. If the amplitude of that image translation is smaller than the period of the phase mask 60, the speckle contrast may be further decreased without significantly degrading the image resolution. For example, the scanning mirror may be shifted by a quarter or half of the period of the periodic phase mask 60.

For the purposes of describing and defining the present invention it is noted that the term "approximately" is utilized to represent the inherent degree of uncertainty that may be attributed to any quantitative comparison, value, measurement, or other representation. The term "approximately" is also utilized herein to represent the degree by which a quantitative representation may vary from a stated reference without resulting in a change in the basic function of the subject matter at issue.

It is also noted that recitations herein of a component of the present invention being "programmed" in a particular way, "configured" or "programmed" to embody a particular property, or function in a particular manner, are structural recitations as opposed to recitations of intended use. More specifically, the references herein to the manner in which a component is "programmed" or "configured" denotes an existing physical condition of the component and, as such, is to be taken as a definite recitation of the structural characteristics of the component.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A laser projection system comprising:
a visible light source comprising at least one laser;
a system controller programmed to generate a scanned laser image by operating the laser for optical emission of encoded image data and controlling a scanning element to scan an output beam of the visible light source across a plurality of image pixels;
a first lens configured to focus the scanned output beam to form an intermediate laser image;
a second lens configured to project the intermediate laser image onto a projection surface;
a periodic phase mask positioned closer to the intermediate laser image than to the first and second lenses and comprising a period that is approximately equal to or greater than a beam waist diameter of the scanned output beam at the intermediate laser image, wherein the periodic phase mask generates a plurality of orders of diffraction; and
a pupil phase mask comprising a plurality of pixels positioned in an optical path that is after the second lens and configured to modify a relative phase of the orders of diffraction generated by the periodic phase mask,
wherein projection of the scanned output beam jumps progressively from pixel to pixel, thereby reducing speckle contrast in a scanned laser image that is projected onto the projection surface.

2. The laser projection system as claimed in claim 1, wherein the periodic phase mask creates a single sub-beam when the scanned output beam is focused on a center portion of an individual period of the periodic phase mask, and creates at least two sub-beams when the scanned output beam is focused between at least two periods of the periodic phase mask.

3. The laser projection system as claimed in claim 1, wherein an average angle of incidence projected onto the projection surface is varied as the scanned output beam scans the periodic phase mask.

4. The laser projection system as claimed in claim 1, wherein the first lens is configured to focus the scanned output beam such that the beam waist diameter is less than or equal to the period of the periodic phase mask at the intermediate laser image.

5. The laser projection system as claimed in claim 1, wherein the periodic phase mask comprises a lens array, each lens having a diameter that is approximately equal to or greater than the beam waist diameter of the scanned output beam at the intermediate laser image.

6. The laser projection system as claimed in claim 5, wherein a pitch of the lens array multiplied by a magnification factor of the second lens is less than or approximately equal to an eye resolution element.

7. The laser projection system as claimed in claim 1, wherein the periodic phase mask comprises at least one holographic beam splitter.

8. The laser projection system as claimed in claim 1, wherein the periodic phase mask comprises a sinusoidal grating.

9. The laser projection system as claimed in claim 1, wherein the pupil phase mask comprises a static phase mask positioned in a Fourier plane of the second lens and is configured to alter the relative phase of the orders of diffraction generated by the periodic phase mask such that phases of multiple orders of diffraction are equal.

10. The laser projection system as claimed in claim 1, wherein the pupil phase mask comprises a dynamic phase mask positioned in a Fourier plane of the second lens and is modulated such that each pixel of the dynamic phase mask changes the phase of each diffraction order as a function of time.

11. The laser projection system as claimed in claim 1, wherein the pupil phase mask is incorporated into the second lens.

12. The laser projection system as claimed in claim 11, wherein the second lens is configured to modify the relative phase of the orders of diffraction generated by the periodic phase mask.

13. The laser projection system as claimed in claim 1, wherein the system controller is programmed to:
control the scanning element such that the scanning element operates at a fast scanning direction to create a line of the scanned laser image and at a slow scanning direction to create multiple lines of the scanned laser image; and
misalign an angle of the scanning element at a frame-per-frame frequency such that the scanned laser image in a slow axis direction is shifted by an amplitude smaller that the period of the periodic phase mask.

14. A laser projection system comprising:
a visible light source comprising at least one laser;
a system controller programmed to generate an intermediate laser image at an intermediate plane by operating the laser for optical emission of encoded image data and controlling a scanning element to scan an output beam of the visible light source across a plurality of image pixels; and
a periodic phase mask positioned at the intermediate plane comprising a period that is approximately equal to or greater than a beam waist diameter of the scanned output beam at the intermediate plane and configured to generate a plurality of orders of diffraction.

15. The laser projection system as claimed in claim 14, wherein the periodic phase mask creates a single sub-beam when the scanned output beam is focused on a center portion of an individual period of the periodic phase mask, and creates at least two sub-beams when the scanned output beam is focused between at least two periods of the periodic phase mask.

16. The laser projection system as claimed in claim 14, wherein the periodic phase mask comprises a holographic beam splitter or a sinusoidal grating.

17. The laser projection system as claimed in claim 14, wherein the laser projection system further comprises:
a first lens configured to focus the scanned output beam to form the intermediate laser image; and
a second lens configured to project the intermediate laser image onto a projection surface.

18. The laser projection system as claimed in claim 17, wherein projection of the scanned output beam jumps progressively from pixel to pixel, thereby creating multiple speckle patterns.

19. The laser projection system as claimed in claim 17, wherein the second lens is configured to modify a relative phase of the orders of diffraction generated by the periodic phase mask.

20. The laser projection system as claimed in claim 19, wherein the second lens is configured to defocus the scanned laser image that is projected onto the projection surface.

21. A laser projection system comprising:
   a visible light source comprising at least one laser;
   a system controller programmed to generate an intermediate laser image at an intermediate plane by operating the laser for optical emission of encoded image data and controlling a scanning element to scan an output beam of the visible light source across a plurality of image pixels; and
   a periodic phase mask positioned at the intermediate plane configured to create a single sub-beam when the scanned output beam is focused on a center portion of an individual period of the periodic phase mask, and create at least two sub-beams when the scanned output beam is focused between at least two periods of the periodic phase mask.

22. A method of reducing speckle in a projected image of a laser scanner projection system, said method comprising:
   passing a scanning laser beam comprising encoded image data through a first lens that focuses the laser beam to form an intermediate laser image;
   passing the scanning laser beam comprising the intermediate laser image through a periodic phase mask having a period that is equal to or greater than a beam waist diameter of the scanning laser beam at the intermediate laser image;
   generating a plurality of orders of diffraction of the scanning laser beam;
   projecting the intermediate laser image through a second lens and then through a pupil phase mask to form a projected image on a surface, wherein
   the projected intermediate laser image comprises a projected scanned output beam that jumps progressively from pixel to pixel to reduce speckle contrast in a the projected image.

* * * * *